United States Patent [19]

Oltean et al.

[11] Patent Number: 4,970,124

[45] Date of Patent: Nov. 13, 1990

[54] NEW MAGNETIC METALLIC PARTICLES USING RARE-EARTH ELEMENTS

[75] Inventors: George L. Oltean; Linn L. Zimmer, both of Rochester, N.Y.

[73] Assignee: Eastman Kodak Company, Rochester, N.Y.

[21] Appl. No.: 192,437

[22] Filed: May 11, 1988

[51] Int. Cl.$^5$ .............................. B22F 1/02
[52] U.S. Cl. ................................ 428/570; 148/301; 428/403; 428/329; 428/694
[58] Field of Search .................. 75/251; 148/801; 428/570, 403, 694, 329

[56] References Cited

U.S. PATENT DOCUMENTS

| | | | |
|---|---|---|---|
| 4,321,302 | 3/1982 | Umeki et al. | 428/404 |
| 4,321,303 | 3/1982 | Morita et al. | 428/404 |
| 4,376,714 | 3/1983 | Pingaud | 252/62.56 |
| 4,390,361 | 6/1983 | Sueyuoshi et al. | 75/0.5 |
| 4,456,475 | 1/1984 | Hirai | 75/0.5 |
| 4,473,619 | 9/1984 | Porco | 428/403 |

FOREIGN PATENT DOCUMENTS

| | | |
|---|---|---|
| 58-212104 | 12/1983 | Japan . |
| 59-145707 | 8/1984 | Japan . |
| 59-162205 | 9/1984 | Japan . |
| 60-063904 | 4/1985 | Japan . |
| 60-135506 | 7/1985 | Japan . |
| 61-204907 | 11/1986 | Japan . |

Primary Examiner—John P. Sheehan
Attorney, Agent, or Firm—William J. Davis

[57] ABSTRACT

Ferromagnetic metallic particles having incorporated into the surface a rare earth element are employed to make magnetic recording elements. These particles are obtained from non-magnetic particle precursors by treating with a rare earth salt in an aqueous solution.

11 Claims, No Drawings

NEW MAGNETIC METALLIC PARTICLES USING RARE-EARTH ELEMENTS

FIELD OF THE INVENTION

The present invention relates to ferromagnetic particles having improved magnetic properties and having improved stability with respect to corrosion and a method for preparing such particles. More specifically, this invention relates to the use of rare earth elements in the outer layers of precursor particles to minimize particle sintering, and to retain particle size and shape during the thermal reduction process. Such particles have improved resistance to changes in magnetic properties when subjected to conditions of high temperature and high humidity over periods of time. The invention also relates to a process for producing such ferromagnetic particles and to magnetic recording elements containing the ferromagnetic particles.

BACKGROUND OF THE INVENTION

Ferromagnetic metallic particles are used in high density magnetic recording media because they possess certain advantageous properties compared to conventional gamma iron oxide, cobalt modified iron oxide and chromium dioxide particles. These advantageous properties include higher coercivity, higher saturation magnetization and higher remanent magnetization which allow for recording of shorter wavelength signals with higher output signal levels. Coercivity of greater than 1000 Oe can be achieved for ferromagnetic metallic particles, whereas conventional cobalt modified iron oxides have a practical upper limit of coercivity of less than 1000 Oe due to instabilities, particularly changes in coercivity with changes in temperature and loss of signal amplitude with repeated playback. Ferromagnetic metallic particles have the disadvantage of being susceptible to oxidation with the passage of time which results in a decrease in the magnetization of the particles and potential signal loss in recorded media. This tendency toward oxidation also causes problems in handling since the particles may spontaneously ignite upon exposure to air if not properly stabilized.

Ferromagnetic metallic particles also have the disadvantage that, during the high temperature reduction process, the particles tend to sinter together and to change in size and shape. Such sintering and morphological changes result in degradation of magnetic properties.

It is therefore desirable to provide ferromagnetic metallic particles having superior magnetic properties and superior resistance to changes in magnetic properties on keeping.

SUMMARY OF THE INVENTION

Ferromagnetic metallic particles are obtained in accordance with the invention by treating non-magnetic precursor particles having specified composition, size and shape with rare earth elements such that the rare earth elements are incorporated into the surface of the precursor particles in an amount of 0.5 to 10 percent by weight based on the weight of the particles. In addition to the rare earth elements, Si can optionally be incorporated into the surface of the precursor particles. The precursor particles are then isolated and thermally treated in a reducing atmosphere to convert the non-magnetic particles into ferromagnetic metallic particles. The resulting ferromagnetic metallic particles contain the rare earth element or elements in amounts comparable to that of the precursor and have superior magnetic properties and superior resistance to changes in properties on keeping. The invention also contemplates magnetic recording elements comprising a support and at least one layer containing the ferromagnetic metallic particles.

DETAILED DESCRIPTION OF THE INVENTION

Upon reduction at elevated temperatures, non-magnetic precursor particles sinter together and change in size and shape. Further, ferromagnetic metallic particles suffer decreases in saturation magnetization upon keeping, especially under conditions of elevated temperature and humidity. Ferromagnetic metallic particles prepared according to the invention do not have the disadvantages described above. In accordance with this invention, ferromagnetic metallic particles having saturation magnetization of 80–120 emu/g and coercivity (Hc) of 500–2000 Oe can be prepared.

By "non-magnetic precursor particles" is meant alpha-FeOOH, delta-FeOOH, gamma-FeOOH, alpha-$Fe_2O_3$, gamma-$Fe_2O_3$, or $Fe_3O_4$. Such particles can be prepared according to methods well known in the patent and published literature. A preferred precursor particle is alpha-FeOOH, the synthesis of which is described in U.S. Pat. No. 4,376,714, filed by B. J. Pingaud, assigned to the same assignee as this application and incorporated herein by reference. After precipitation, oxidation and washing (and optionally drying and thermally treating) the precursor particles are made into a slurry in water. The pH of this slurry is adjusted to from 5 to 7 to insure that the rare earth salt, when added, will remain in solution. To this slurry is added with good stirring, a solution of a water soluble salt of the desired rare earth to provide a weight ratio of rare earth to iron of about 0.005 to 0.1 and preferably from about 0.01 to 0.05. After stirring for a sufficient time to permit the dissolved rare earth salt to contact the precursor particles, preferably for at least 15 minutes, and most preferably from about 15 minutes to about one hour, the pH of the slurry is raised to at least 10 to precipitate the rare earth on to the surface of the precursor particles. The upper limitation of one hour is of importance for economic reasons as no additional advantages are apparent by stirring for longer time periods. To increase the rate and uniformity of adsorption of the rare earth onto the precursor particles, the temperature may be raised and held for a period of time before cooling to ambient temperature. It is preferred that the temperature be raised to from about 25° C. to about 90° C. for a period of time of from about 30 minutes to about 90 minutes before cooling to ambient. At this stage of the process, if desired, a treatment to apply a silicon layer may be conducted by slowly adding with good stirring a solution of a water soluble silicate. After stirring for a period of time, the pH of the slurry is decreased to between 5 and 7 using an acid solution to cause silicon to precipitate onto the precursor particles. The particulate material is isolated by filtration or other appropriate means and is washed. The washed product is then dried to yield the rare earth surface modified precursor particles.

Any suitable rare earth element may be employed to treat the non-magnetic precursor particles in accordance with this invention. Suitable salts include lanthanum trichloride [LaCl$_3$], lanthanum sulfate [La$_2$(SO$_4$)$_3$], samarium trichloride [SmCl$_3$], samarium sulfate [Sm$_2$(SO$_4$)$_3$], europic chloride [EuCl$_3$], europic sulfate [Eu$_2$(SO$_4$)$_3$], europic nitrate [Eu(NO$_3$)$_3$], gadolinium chloride [GdCl$_3$], gadolinium sulfate [Gd$_2$(SO$_4$)$_3$], gadolinium nitrate [Gd(NO$_3$)$_3$], terbium nitrate [Tb(NO$_3$)$_3$], terbium chloride [TbCl$_3$], dysprosium chloride [DyCl$_3$], dysprosium sulfate [Dy$_2$(NO$_3$)$_3$], yttrium acetate [Y(C$_2$H$_3$O$_2$)$_3$], yttrium nitrate [Y(NO$_3$)$_3$], yttrium sulfate [Y$_2$(SO$_4$)$_3$], neodymium sulfate [Nd$_2$(SO$_4$)$_3$], neodymium chloride [NdCl$_3$], neodymium nitrate [Nd(NO$_3$)$_3$], praesodymium sulfate [Pr$_2$(SO$_4$)$_3$], praesodymium chloride [PrCl$_3$], cerous acetate [Ce(C$_2$H$_3$O$_2$)$_3$], cerous halides [CeX$_3$] including chloride bromide and iodide, cerious nitrate [Ce(NO$_3$)$_3$], cerous malate [Ce$_2$(C$_4$H$_4$O$_5$)$_3$], ceric nitrate [Ce(NO$_3$)$_4$], ceric sulfate [Ce(SO$_4$)$_2$], holmium halides [HoX$_3$] including chloride bromide and iodide, erbium halides [ErX$_3$] including chloride and bromide, erbium nitrate [Er(NO$_3$)$_3$], erbium sulfate [Er$_2$(SO$_4$)$_3$], thulium chloride [TmCl$_3$], thulium sulfate [Tm$_2$(SO$_4$)$_3$], thulium oxalate [Tm$_2$(C$_2$O$_4$)$_3$], lutetium chloride [LuCl$_3$], lutetium sulfate [Lu$_2$(SO$_4$)$_3$] and the like.

The rare earth surface modified precursor particles may be dehydrated and annealed at elevated temperature prior to being reduced in a reducing atmosphere at elevated temperature. Dehydration is conducted at a temperature of from about 200° C. to about 400° C. and preferably at from about 200° C. to about 300° C. Annealing is conducted at a temperature of from about 400° C. to about 900° C. and preferably at a temperature of from about 500° C. to about 700° C. The particles are next reduced at a temperature of from about 300° C. to about 900° C. and preferably from about 300° C. to about 550° C. in the presence of hydrogen gas.

After reduction and cooling, the magnetic metallic particles are stabilized by partial oxidation of the particle surfaces by the introduction of small amounts of air in an inert gas flow at temperatures of from about 25° C. to about 200° C. and preferably from about 50° to about 150° C.

Magnetic metallic particles prepared by the methods described in this invention have superior magnetic properties, especially high coercivity and narrow switching field distributions. In addition, only small decreases in magnetization occur when the particles are subjected to conditions of elevated temperature and humidity.

The ferromagnetic metallic particles prepared as described herein can be employed in magnetic recording layers on a wide variety of non-magnetizable supports, including paper, film and similar supports. Such particles can be used in audio, video and instrumentation recording tapes and in magnetic disks. Suitable supports can be subbed by known methods, are generally flexible and include such materials as cellulose acetate film, polyvinyl acetal film, polystyrene film, polyesters such as poly(ethylene terephthalate) film which can be biaxially or asymmetrically stretched, polycarbonate film, paper and metal, such as aluminum or brass. The thickness of the support is subject to variation but such supports generally have a thickness in the range of about 4 micrometers to about 300 micrometers, often in the range of about 6 micrometers to about 30 micrometers, and most often in the range of about 12 micrometers to about 25 micrometers. The support surface coated with the magnetic composition should be as smooth as possible.

Binders that can be used to disperse the metallic particles include any of the binders well known for the manufacture of magnetic recording layers. Typical binders are polymeric binding agents such as copolymers of vinyl acetate with vinyl chloride, copolymers of vinylidene chloride with acrylonitrile, copolymers of acrylic and/or ethacrylic esters, polyvinylbutyral, copolymers of butadiene with styrene, terpolymers of acrylonitrile, vinylidene chloride and maleic anhydride, crosslinked or noncrosslinked, homopolymers or copolymers such as polyamides, polyurethanes, polyesters and the like as well as mixtures of these binders. Very good results can be obtained with a copolymer of vinyl acetate with vinyl chloride, partially hydrolyzed, and possibly crosslinked with an isocyanate or any of the many similar reactive constituents, or by using polyurethanes or polyesters or a mixture of these binders. The amount of the binder employed with respect to the amount of metallic particles is generally in the range of about 10 percent to about 35 percent, by weight, and preferably from about 15 percent to about 20 percent, by weight.

Suitable solvents that can be employed in the preparation of the magnetic dispersions include organic materials such as toluene, tetrahydrofuran, methyl ethyl ketone, methyl isobutyl ketone cyclohexanone, butyl alcohol, butyl acetate, methylene chloride and mixtures thereof. Of these toluene, cyclohexanone, tetrahydrofuran and the ketones are preferred. The magnetic recording layers can contain other additives such as lubricants, as would be obvious to those skilled in the art.

It is known that the smoothness of the surface of a magnetic recording element is very important in obtaining good signal reproduction, particularly at short wavelengths, because the magnetic flux decreases greatly as the distance separating the recording head and the magnetic layer increases. Furthermore, variations in coupling between the recording or reproducing head and the magnetic recording layer increase the noise level and also the abrasion of the recording head. Accordingly, it is preferred that the magnetic recording layers be as smooth as possible. Such smoothness can be obtained e.g. by calendering, according to the teachings of Legras et al U.S. Pat. No. 4,163,823, issued Aug. 7, 1979. This smoothness can be expressed in terms of "percent contact area" which is determined with relation to a reference surface consisting of the hypotenuse surface of a transparent optical prism. The value of an incident luminous flux directed for total reflection from the hypotenuse surface is equal to 0. The flux reflected by the hypotenuse surface is, therefore, equal to 0 but is reduced and becomes 0' when a light absorber is placed in optical contact with the hypotenuse surface. A sample of the magnetic element being measured, when contacted under controlled pressure against the hypotenuse surface of the prism (with the outermost magnetic recording layer of the element in contact with the surface) produced light absorption that increases as the smoothness increases. The "percent contact area" is equal to $[(\phi-\phi')/\phi]\times 100$. The value of this "percent contact area" increases with the flatness of the surface of the recording magnetic layer, i.e. with the surface smoothness of the layer.

The invention is further illustrated in the following examples and accompanying tables:

EXAMPLE 1

Alpha FeOOH is prepared according to the methods described in U.S. Pat. No. 4,376,714. The precipitated FeOOH is washed to remove salts and is diluted to a 2% slurry. The pH of 10 Kg of this slurry is adjusted to between 6.0 and 7.0 using $H_2SO_4$. A solution of 4.6 g of yttrium acetate in 0.2 liter of distilled water is prepared by heating at 80° C. and adding acetic acid until the yttrium acetate is fully dissolved. The FeOOH slurry is heated to 70° C. and the hot yttrium acetate solution is slowly added to the FeOOH slurry with good stirring. (This solution yields a Y/Fe weight ratio of 0.01). After stirring for 15 minutes, the pH of the slurry is slowly raised to greater than 10.0 using a solution of NaOH. The slurry is heated to 90° C. for one hour and is then cooled to 25° C. To the slurry is slowly added with good stirring a solution of 44.9 g of $Na_2SiO_3.9H_2O$ dissolved in 228 ml of distilled water. This slurry is stirred for 1.5 hours and the pH is then decreased to between 6 and 7 using sulfuric acid. The material is pumped into a filter press and washed until the conductivity of the filtrate is less than 400 micromhos. The solid material is dried under vacuum at 100° C. 25 g of the yttrium surface treated FeOOH is heated to 300° C. in a nitrogen gas stream in a quartz fluidized bed reactor tube to dehydrate to alpha $Fe_2O_3$. The temperature is raised to 500° C. and hydrogen gas is introduced to the reactor reducing the material to the magnetic metallic state. The progress of the reaction is monitored by analyzing the water content of the effluent gas stream. When water evolution ceases, the hydrogen gas flow is stopped and nitrogen flow continued while the material is allowed to cool to 25° C. Air is slowly added to the nitrogen gas stream and the temperature is allowed to rise to 100° C. while the stabilizing oxidation reaction occurs. As the temperature drops, the partial pressure of air in the gas stream is slowly increased until the entire flow is air. The product is isolated and has the following magnetic properties: Hc=1683 Oe, saturation magnetization (sigma-m) 99.9 emu/g, squareness ratio 0.58, switching field distribution 1.10. The powder is stored in a chamber for four weeks at 60° C./90% RH and the saturation magnetization is measured after one and four weeks. The ratios of the saturation magnetizations of incubated samples to fresh samples are 0.93 and 0.89 after one and four weeks respectively.

EXAMPLE 1A

The procedure of Example 1 is repeated except that prior to the reduction step, the alpha $Fe_2O_3$ is annealed for one hour at 700° C. in a nitrogen gas flow.

EXAMPLE 1B

The procedure of Example 1 is repeated except that the reduction is conducted at 450° C.

EXAMPLES 2A AND 2B

Ferromagnetic metallic particles are prepared in the same way as in Example 1 except that the level of yttrium is adjusted to 3.0% (Example 2A) and 5.0% (Example 2B).

EXAMPLES 3A AND 3B

Ferromagnetic metallic particles are prepared as described in Example 2A with 3% yttrium, except that reduction temperatures of 450° C. (Example 3A) and 550° C. (Example 3B) are used.

EXAMPLES 4A AND 4B

Ferromagnetic metallic particles are prepared according to Example 2A at the 3% yttrium level and 2B at 5% yttrium level, respectively, except that prior to reduction, the particles are annealed for one hour at 700° C. in a nitrogen gas flow.

The properties for Examples 1 through 4B are listed in Table I.

EXAMPLE 5

Ferromagnetic metallic particles are prepared following the general procedure of Examples 1 through 4B except that neodymium sulfate is used as the source of the rare earth element under the conditions and in the amounts set forth in Table II. The properties are listed accordingly.

EXAMPLE 6

Ferromagnetic metallic particles are prepared following the general procedure of Examples 1 through 4B except that praesodymium sulfate is used as the source of the rare earth element under the conditions and in the amounts set forth in Table III. The properties are listed accordingly.

EXAMPLE 7

Ferromagnetic metallic particles are prepared following the general procedure of Examples 1 through 4B except that cerium acetate is used as the source of the rare earth element under the conditions and in the amounts set forth in Table IV. The properties are listed accordingly.

EXAMPLE 8-22

Preparation of Magnetic Recording Elements

In Examples 8-22, particles prepared in accordance with Examples 1 through 7G are utilized in the preparation of recording elements. The particular rare earth and the percentage employed, the conditions of the particle preparation and the Example Number together with the properties and characteristics are set forth in Table V.

The procedure for preparing the recording elements in each case is generally as follows:

About 4 grams of ferromagnetic metallic particles and about 15 ml of 1.5 mm chrominite media are ground on a paint shaker in a 30 ml bottle for 45 minutes in 7 ml of a solution of 4% of a phosphate ester wetting agent sold under the designation Gafac RE610 sold by GAF Corp., 0.7% oleic acid, 19% cyclohexanone and 76% tetrahydrofuran (all percentages being by weight). The ground particles are allowed to cool for 10 minutes then 7 ml of a solution of 3% of a polymer of vinyl chloride, vinyl acetate and vinyl alcohol sold under the designation VAGH by Union Carbide, 12% of a polyester urethane polymer sold under the designation CA310 by Morton Chemical Company and 85% cyclohexanone (all percentages being by weight) is added and the dispersion shaken for an additional 45 minutes. The dispersion is allowed to cool and then drawn down under a 1.5 mil knife on to a polyethylene terephthalate support in the presence or absence of an orienting magnet. The properties are set forth in Table V in the X (longitudinal) direction and the Y (transverse) direction.

COMPARATIVE EXAMPLES 1-5

Ferromagnetic metallic particles are prepared by repeating Example 1 except that no rare earth surface modification is done. The conditions followed and properties are set forth in Table VI.

COMPARATIVE EXAMPLE 6

Coatings of the particles without rare earth treatment were made as described in Example 8. The properties of the coatings are listed in Table VII.

From the data included in the examples and in the tables, it can be seen that the coercivity of particles containing the rare earth elements is higher than the particles without the rare earth elements. In addition, the switching field distributions of the rare earth treated particles are narrower. The changes in magnetization upon storage at elevated temperature and humidity are less for the rare earth treated materials.

As shown by the information in the examples and tables, the coercivity tends to increase as the reduction temperature is increased up to 500° C., indicating that the preferred reduction temperature is about 500° C. The optimum temperature for the materials without the rare earth treatment is 450° C. The reduction reaction is more rapid at elevated temperatures, thus the rare earth treated materials also offer a process advantage in preparation. It can also be seen that the coercivity generally improves somewhat as the rare earth/Fe level is increased from 1.0% to 3.0% but that only minor improvements are found at 5%, for a given reduction temperature. It was further found that the use of the anneal step prior to reduction generally results in higher coercivity, higher squareness and narrower switching field distribution.

The superior properties of the particles described in the invention are further demonstrated in the properties of the coatings described in Examples 8–22 and from the data in Table V. Superior coercivity, squareness and switching field distribution values are obtained for the particles treated with the rare earth elements.

TABLE I

Magnetic Properties of Fe(O) from Yttrium Treated FeOOH

| Example No. | % Y | Anneal Temp. (°C.) | Reduction Temp. (°C.) | $H_c$ Oe | $\sigma m$ Emu/g | SR | SFD | Stability 1 wk | 4 wks |
|---|---|---|---|---|---|---|---|---|---|
| 1 | 1.0 | — | 500 | 1683 | 99.9 | 0.58 | 1.10 | 0.93 | 0.89 |
| 1A | 1.0 | 700 | 500 | 1712 | 97.6 | 0.59 | 0.97 | 0.93 | 0.88 |
| 1B | 1.0 | — | 450 | 1650 | 95.7 | 0.56 | 0.94 | | |
| 2A | 3.0 | | 500 | 1722 | 99.1 | 0.59 | 0.97 | 0.94 | 0.89 |
| 2B | 5.0 | — | 500 | 1727 | 96.5 | 0.59 | 0.98 | | |
| 3A | 3.0 | | 450 | 1629 | 92.4 | 0.58 | 1.10 | | |
| 3B | 3.0 | | 550 | 1638 | 100.7 | 0.56 | 1.34 | | |
| 4A | 3.0 | 700 | 500 | 1747 | 94.4 | 0.59 | 0.94 | 0.93 | 0.87 |
| 4B | 5.0 | 700 | 500 | 1718 | 94.7 | 0.59 | 0.93 | | |

TABLE II

Magnetic Properties of Fe(O) from Neodymium Treated FeOHH

| Example No. | % Nd | Anneal Temp. (°C.) | Reduction Temp. (°C.) | $H_c$ Oe | $\sigma m$ Emu/g | SR | SFD | Stability 1 wk | 4 wks |
|---|---|---|---|---|---|---|---|---|---|
| 5 | 1.0 | — | 500 | 1380 | 114.2 | 0.53 | 1.48 | 0.92 | 0.82 |
| 5A | 1.0 | 700 | 500 | 1502 | 112.4 | 0.57 | 1.02 | 0.90 | 0.83 |
| 5B | 3.0 | — | 450 | 1581 | 95.6 | 0.53 | 1.37 | | |
| 5C | 3.0 | — | 400 | 1528 | 92.7 | 0.53 | 1.22 | | |
| 5D | 3.0 | — | 500 | 1655 | 100.6 | 0.54 | 1.16 | 0.92 | 0.86 |
| 5E | 3.0 | 700 | 500 | 1709 | 96.9 | 0.57 | 1.00 | 0.91 | 0.85 |
| 5F | 3.0 | — | 550 | 1587 | 108.3 | 0.54 | 1.51 | | |
| 5G | 5.0 | — | 500 | 1657 | 99.5 | 0.55 | 1.07 | 0.93 | 0.87 |
| 5H | 5.0 | 700 | 500 | 1707 | 100.2 | 0.58 | 0.96 | 0.93 | 0.87 |

TABLE III

Magnetic Properties of Fe(O) from Praseodymium/3.3% Silica Treated a-FeOOH

| Example No. | % Pr | Anneal Temp. (°C.) | Reduction Temp. (°C.) | $H_c$ Oe | $\sigma m$ Emu/g | SR | SFD | Stability 1 wk | 4 wks |
|---|---|---|---|---|---|---|---|---|---|
| 6 | 1.0 | — | 500 | 1598 | 110.4 | 0.56 | 1.30 | | |
| 6A | 1.0 | 700 | 500 | 1727 | 102.1 | 0.60 | 0.87 | | |
| 6B | 3.0 | — | 450 | 1567 | 96.7 | 0.54 | 1.23 | | |
| 6C | 3.0 | — | 500 | 1636 | 100.2 | 0.57 | 1.21 | 0.94 | 0.88 |
| 6D | 3.0 | 700 | 500 | 1679 | 99.5 | 0.59 | 1.03 | 0.92 | 0.81 |
| 6E | 3.0 | — | 550 | 1557 | 109.2 | 0.55 | 1.40 | | |
| 6F | 5.0 | — | 500 | 1683 | 102.3 | 0.58 | 1.08 | 0.93 | 0.87 |
| 6G | 5.0 | 700 | 500 | 1720 | 98.4 | 0.59 | 0.95 | 0.92 | 0.84 |

TABLE IV

Magnetic Properties of Fe(O) from Cerium Treated FeOOH

| Example No. | Aim % Ce | Anneal Temp. (°C.) | Reduction Temp. (°C.) | $H_c$ Oe | $\sigma m$ Emu/g | SR | SFD | Stability 1 wk | 4 wks |
|---|---|---|---|---|---|---|---|---|---|
| 7 | 1.0 | — | 500 | 1643 | 96.7 | 0.57 | 1.09 | 0.93 | 0.88 |
| 7A | 1.0 | 700 | 500 | 1740 | 98.9 | 0.59 | 0.86 | 0.91 | 0.86 |

TABLE IV-continued

Magnetic Properties of Fe(O) from Cerium Treated FeOOH

| Example No. | Aim % Ce | Anneal Temp. (°C.) | Reduction Temp. (°C.) | $H_c$ Oe | $\sigma m$ Emu/g | SR | SFD | Stability 1 wk | Stability 4 wks |
|---|---|---|---|---|---|---|---|---|---|
| 7B | 3.0 | — | 450 | 1604 | 88.7 | 0.57 | 1.03 | | |
| 7C | 3.0 | — | 500 | 1641 | 96.3 | 0.58 | 1.03 | 0.93 | 0.87 |
| 7D | 3.0 | 700 | 500 | 1725 | 96.3 | 0.60 | 0.83 | 0.94 | 0.86 |
| 7E | 3.0 | — | 550 | 1400 | 100.6 | 0.50 | 1.67 | | |
| 7F | 5.0 | — | 500 | 1585 | 97.9 | 0.57 | 1.27 | | |
| 7G | 5.0 | 700 | 500 | 1735 | 96.3 | 0.60 | 0.85 | | |

TABLE V

| Example No. | Percent Rare Earth Conditions | X/Y | Orientation | $H_c$ Oe | SR | SFD | % SC | OR |
|---|---|---|---|---|---|---|---|---|
| 8 | 3% Y | X | No | 1617 | 0.66 | 0.81 | 60 | 1.08 |
|   | (Example | Y | No | 1573 | 0.61 | 0.90 | | |
|   | 2A) | X | Yes | 1660 | 0.73 | 0.68 | 53 | 1.38 |
|   |   | Y | Yes | 1506 | 0.53 | 1.06 | | |
| 9 | 3% Y | X | No | 1649 | 0.66 | 0.74 | 51 | 1.08 |
|   | Anneal | Y | No | 1610 | 0.61 | 0.83 | | |
|   | (Example | X | Yes | 1687 | 0.72 | 0.63 | 51 | 1.33 |
|   | 4A) | Y | Yes | 1548 | 0.54 | 1.01 | | |
| 10 | 5% Y | X | No | 1620 | 0.66 | 0.79 | 60 | 1.08 |
|   | (Example | Y | No | 1583 | 0.61 | 0.89 | | |
|   | 2B) | X | Yes | 1648 | 0.67 | 0.73 | 55 | 1.18 |
|   |   | Y | Yes | 1557 | 0.57 | 0.94 | | |
| 11 | 1% Y | X | No | 1585 | 0.65 | 0.84 | 52 | 1.07 |
|   | (Example | Y | No | 1548 | 0.61 | 0.89 | | |
|   | 1B) | X | Yes | 1629 | 0.71 | 0.70 | 51 | 1.29 |
|   |   | Y | Yes | 1487 | 0.55 | 1.08 | | |
| 12 | 1% Pr | X | No | 1487 | 0.62 | 1.09 | 69 | 1.09 |
|   | (Example | Y | No | 1436 | 0.57 | 1.23 | | |
|   | 6) | X | Yes | 1530 | 0.70 | 0.92 | 64 | 1.40 |
|   |   | Y | Yes | 1370 | 0.50 | 1.40 | | |
| 13 | 1% Pr | X | No | 1602 | 0.65 | 0.76 | 53 | 1.08 |
|   | Anneal | Y | No | 1565 | 0.60 | 0.87 | | |
|   | (Example | X | Yes | 1643 | 0.72 | 0.64 | 52 | 1.36 |
|   | 6A) | Y | Yes | 1508 | 0.53 | 1.03 | | |
| 14 | 5% Pr | X | No | 1571 | 0.65 | 0.85 | 64 | 1.08 |
|   | (Example | Y | No | 1520 | 0.60 | 0.98 | | |
|   | 6F) | X | Yes | 1627 | 0.73 | 0.69 | 63 | 1.43 |
|   |   | Y | Yes | 1424 | 0.51 | 1.24 | | |
| 15 | 5% Pr | X | No | 1597 | 0.65 | 0.79 | 62 | 1.08 |
|   | Anneal | Y | No | 1556 | 0.60 | 0.89 | | |
|   | (Example | X | Yes | 1659 | 0.74 | 0.63 | 58 | 1.45 |
|   | 6G) | Y | Yes | 1461 | 0.51 | 1.13 | | |
| 16 | 1% Ce | X | No | 1564 | 0.65 | 0.87 | 63 | 1.10 |
|   | (Example | Y | No | 1514 | 0.59 | 1.03 | | |
|   | 7) | X | Yes | 1586 | 0.70 | 0.80 | 62 | 1.30 |
|   |   | Y | Yes | 1479 | 0.54 | 1.12 | | |
| 17 | 1% Ce/ | X | No | 1624 | 0.66 | 0.72 | 55 | 1.06 |
|   | Anneal | Y | No | 1593 | 0.62 | 0.77 | | |
|   | (Example | X | Yes | 1656 | 0.71 | 0.63 | 57 | 1.27 |
|   | 7A) | Y | Yes | 1555 | 0.56 | 0.89 | | |
| 18 | 3% Ce/ | X | No | 1592 | 0.66 | 0.74 | 61 | 1.10 |
|   | Anneal | Y | No | 1550 | 0.60 | 0.84 | | |
|   | (Example | X | Yes | 1626 | 0.72 | 0.63 | 60 | 1.33 |
|   | 7D) | Y | Yes | 1502 | 0.54 | 0.98 | | |
| 19 | 3% Nd | X | No | 1545 | 0.65 | 0.89 | 58 | 1.10 |
|   | (Example | Y | No | 1490 | 0.59 | 1.08 | | |
|   | 5D) | X | Yes | 1596 | 0.72 | 0.76 | 52 | 1.38 |
|   |   | Y | Yes | 1407 | 0.52 | 1.27 | | |
| 20 | 3% Nd/ | X | No | 1611 | 0.65 | 0.79 | 65 | 1.08 |
|   | Anneal | Y | No | 1567 | 0.60 | 0.88 | | |
|   | (Example | X | Yes | 1666 | 0.74 | 0.62 | 59 | 1.45 |
|   | 5E) | Y | Yes | 1480 | 0.51 | 1.15 | | |
| 21 | 5% Nd | X | No | 1576 | 0.66 | 0.86 | 65 | 1.12 |
|   | (Example | Y | No | 1511 | 0.59 | 0.98 | | |
|   | 5G) | X | Yes | 1612 | 0.70 | 0.78 | 58 | 1.30 |
|   |   | Y | Yes | 1463 | 0.54 | 1.13 | | |
| 22 | 5% Nd/ | X | No | 1613 | 0.66 | 0.78 | 60 | 1.10 |
|   | Anneal | Y | No | 1560 | 0.60 | 0.89 | | |
|   | (Example | X | Yes | 1668 | 0.74 | 0.62 | 56 | 1.45 |
|   | 5H) | Y | Yes | 1468 | 0.51 | 1.15 | | |

TABLE VI

| Comparison Example No. | % Si | Anneal Temp. (°C.) | Reduction Temp. (°C.) | $H_c$ Oe | $\sigma m$ Emu/g | SR | SFD | Stability 1 wk | 4 wks |
| --- | --- | --- | --- | --- | --- | --- | --- | --- | --- |
| | | | (Comparison) | | | | | | |
| 1 | 3.3 | — | 400 | 1534 | 95.3 | 0.56 | 1.29 | | |
| 2 | 3.3 | — | 450 | 1604 | 100.6 | 0.57 | 1.20 | 0.89 | 0.8 |
| 3 | 3.3 | — | 500 | 1550 | 109.4 | 0.56 | 1.38 | | |
| 4 | 3.3 | — | 550 | 1263 | 118.6 | 0.55 | 2.26 | | |
| 5 | 3.3 | 700 | 450 | 1684 | 100.9 | 0.60 | 0.91 | 0.87 | 0.7 |

TABLE VII

| Comparison Example No. | Percent Rare Earth Conditions | X/Y | Orientation | $H_c$ Oe | SR | SFD | % SC | OR |
| --- | --- | --- | --- | --- | --- | --- | --- | --- |
| 6A | 3.3% Si | X | No | 1529 | 0.64 | 0.93 | 43 | 1.05 |
| | (Comparison | Y | No | 1498 | 0.61 | 1.02 | | |
| | Example 2) | X | Yes | 1557 | 0.67 | 0.86 | 45 | 1.16 |
| | | Y | Yes | 1470 | 0.58 | 1.12 | | |
| 6B | 3.3% Si | X | No | 1583 | 0.65 | 0.74 | 48 | 1.07 |
| | Anneal | Y | No | 1543 | 0.61 | 0.86 | | |
| | (Comparison | X | Yes | 1617 | 0.69 | 0.66 | 45 | 1.21 |
| | Example 5) | Y | Yes | 1512 | 0.57 | 0.95 | | |

What is claimed is:

1. Ferromagnetic metallic iron particles or non-magnetic iron and oxygen containing particle precursors thereof comprising metallic iron particles or non-magnetic iron and oxygen containing particle precursors thereof having incorporated into the surface of the particles from 0.5 to 10 percent by weight of a rare earth element based on the weight of the iron in the particles.

2. Ferromagnetic metallic iron particles comprising metallic iron particles having incorporated into the surface of the particles from 0.5 to 10 percent by weight of a rare earth element based on the weight of the iron in the particles.

3. Non-magnetic iron and oxygen containing particle precursors of ferromagnetic metallic iron particles comprising non-magnetic iron and oxygen containing precursor particles thereof having incorporated into the surface of the particles from 0.5 to 10 percent by weight of a rare earth element based on the weight of the iron in the particles.

4. The particles of claim 1 having incorporated into the surface of the particles from 1 to 5 percent by weight of a rare earth element based on the weight of the iron in the particles.

5. The non-magnetic oxygen containing particle precursors of claim 3 wherein the particles are alpha-FeOOH, delta-FeOOH, gamma-FeOOH, alpha-Fe$_2$O$_3$ or Fe$_3$O$_4$.

6. The non-magnetic oxygen containing particle precursors of claim 3 wherein the particles are alpha-FeOOH.

7. The ferromagnetic metallic particles of claim 2 wherein the rare earth is incorporated into the surface of from 1 to 5 percent by weight base on the weight of iron in the particles.

8. The ferromagnetic metallic particles of claim 1 wherein the rare earth is incorporated into the surface of from 1 to 3 percent by weight base on the weight of iron in the particles.

9. A magnetic recording element comprising a support and at least one layer containing the ferromagnetic metallic particles of claim 2.

10. A magnetic recording element comprising a support and at least one layer containing the ferromagnetic metallic particles of claim 7.

11. A magnetic recording element comprising a support and at least one layer containing the ferromagnetic metallic particles of claim 8.

* * * * *